Nov. 28, 1933.                F. G. ALLEN                1,936,817
                                TIRE TOOL
                            Filed Nov. 9, 1932            3 Sheets-Sheet 1
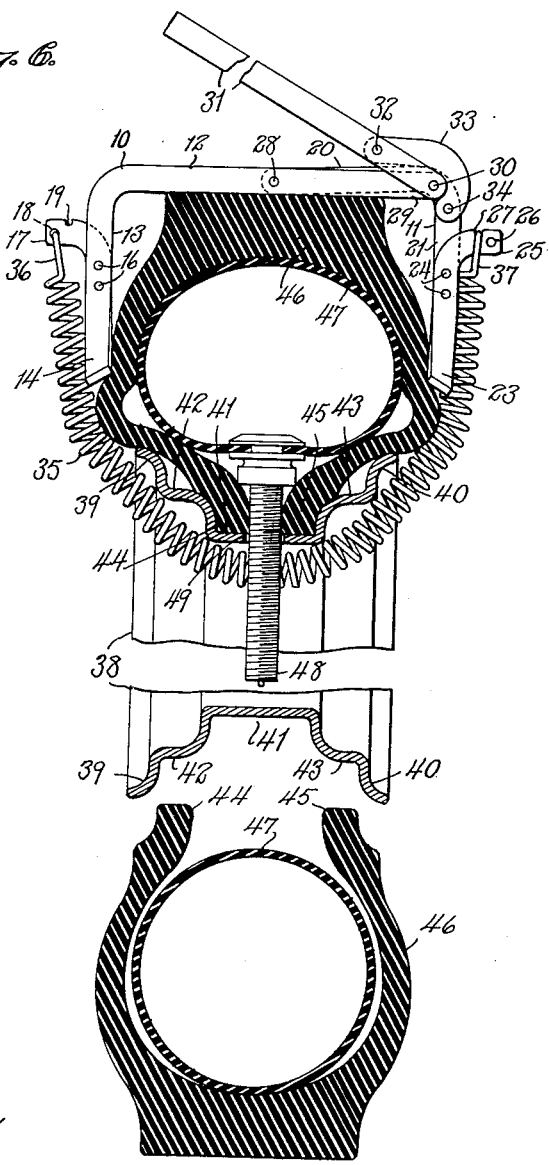
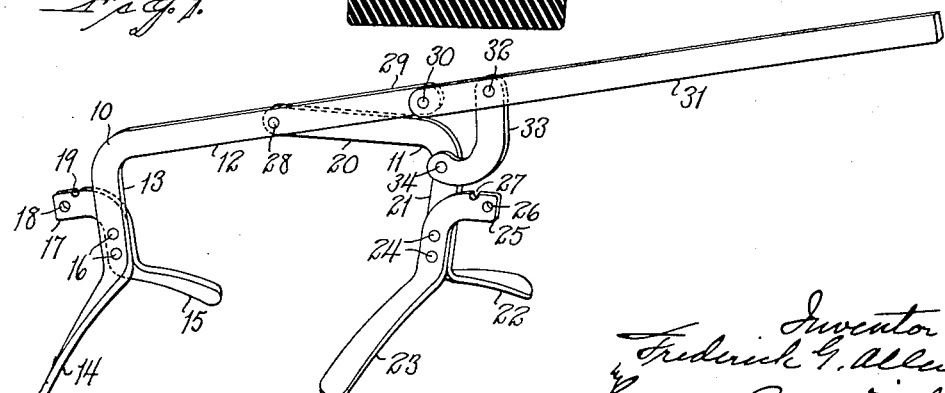

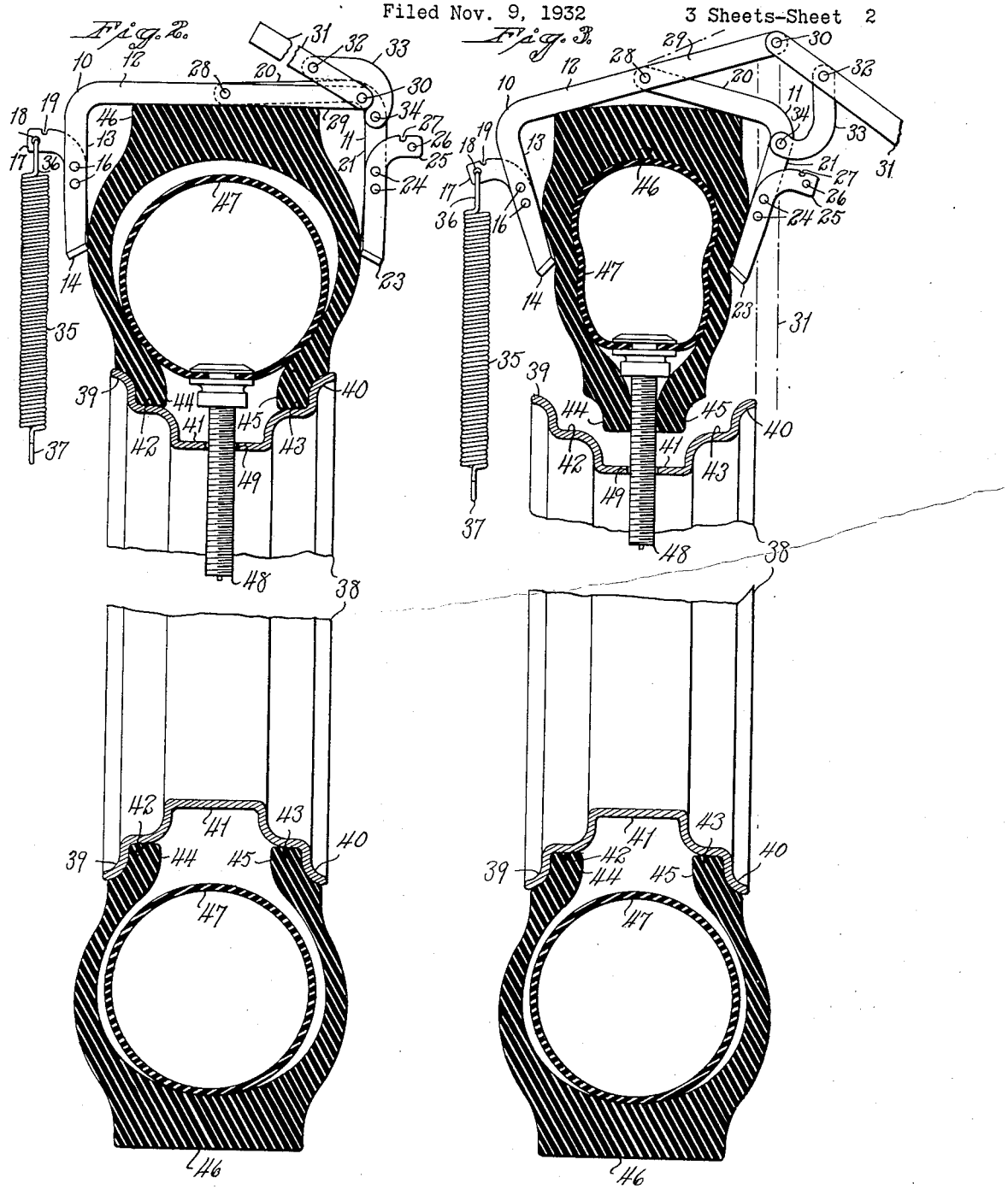

Nov. 28, 1933.  F. G. ALLEN  1,936,817
TIRE TOOL
Filed Nov. 9, 1932  3 Sheets-Sheet 3
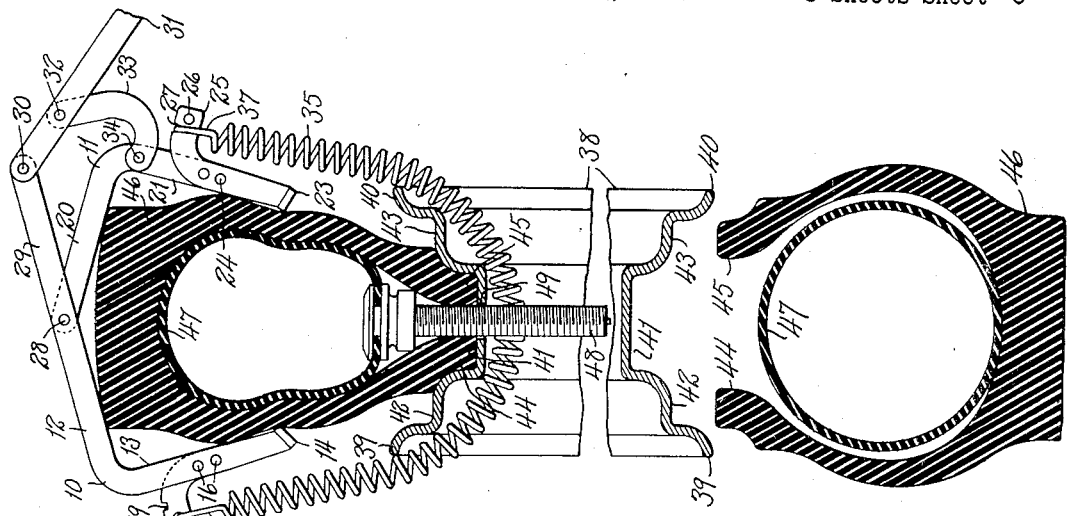
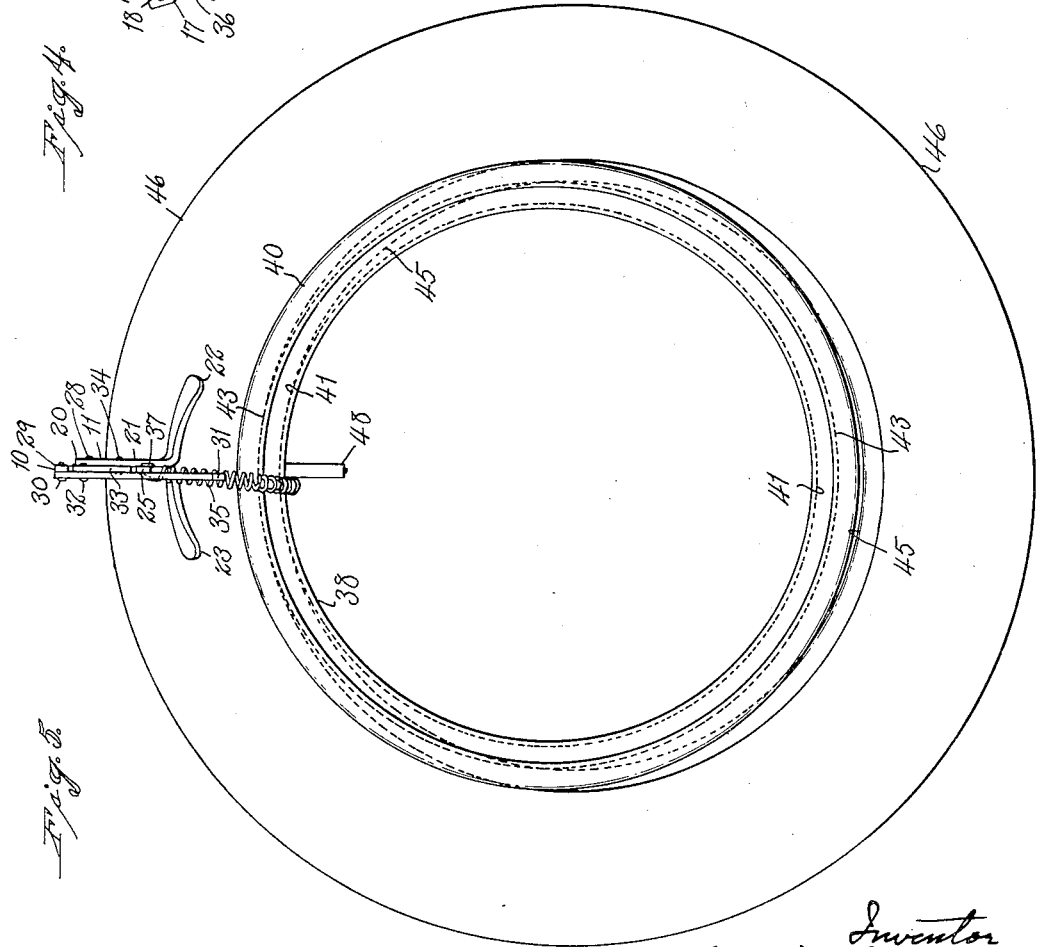

Patented Nov. 28, 1933

1,936,817

UNITED STATES PATENT OFFICE 1,936,817

TIRE TOOL

Frederick G. Allen, New Haven, Conn.

Application November 9, 1932. Serial No. 641,860

8 Claims. (Cl. 157—6)

This invention relates to improvements in tire tools and relates in particular to tire tools for facilitating the removal and installation of tires with respect to so-called "drop" or "depressed-center" rims.

The main object of my present invention is to provide a reliable and effective tire tool having its features so combined and arranged as to provide for laterally compressing a tire and also for exerting force tending to move the tire in substantially its own plane into an eccentric position with respect to its rim, to thereby seat a portion of its complementary beads into the depressed center of its rim.

A further object of my invention is to provide at a relatively low cost for manufacture a tire tool characterized as above and having certain other features of construction and combinations of parts as will more fully appear from the following.

In the accompanying drawings:

Fig. 1 is a perspective view of one form which a tire tool embodying my invention may assume:

Fig. 2 is a broken view in transverse section of a tire-rim and tire, and showing my improved tire tool applied to the said tire preparatory to laterally compressing the same and bodily displacing the same into an eccentric position;

Fig. 3 is a similar view but showing the tire tool operated to laterally compress the tire prior to the bodily displacement of the same in the plane of the rim;

Fig. 4 is a similar view showing the tire as being eccentrically displaced bodily and the strap-member interconnected to both of the clamping-arms;

Fig. 5 is a view in side elevation of the rim, tire and tire tool shown in positions respectively corresponding to those in which they are shown in Fig. 4; and Fig. 6 is a broken transverse sectional view corresponding to Figs. 2 to 4 inclusive, but showing the tire tool as having its arms swung in appropriate directions to further tension the strap-member and positively hold the tire in its eccentric position.

The particular tire tool herein chosen for the illustration of my invention includes a pair of complementary clamping-arms 10 and 11, pivotally interconnected, as will hereinafter appear, for rocking movement relative to each other, for the purpose of laterally compressing the tire-casing.

The clamping-arm 10 includes angularly-disposed reaches 12 and 13, the lower end of which latter is laterally offset and slightly twisted to form a tire-engaging finger 14 complementing an oppositely-diverging tire-engaging finger 15 secured to the reach 13 of the clamping-arm 10 by rivets or other suitable means 16. The upper end of the member which includes the finger 15 is outwardly bent to form a strap-attaching finger 17 having a lateral perforation 18 and formed in its upper edge with a notch 19. Either the perforation 18 or the notch 19 is adapted, as will hereinafter appear, to receive one end of a strap-member.

Similarly, the clamping-arm 11 includes two complementary angularly-disposed reaches 20 and 21, the lower end of the latter of which is laterally offset and slightly twisted to form a tire-engaging finger 22 complementing a similar but oppositely offsetting finger 23 which is secured to the reach 21 of the arm 11 by rivets or any other suitable means 24. Similar to the finger 15, the finger 23 just referred to has its upper end outwardly turned to form a strap-attaching finger 25 having a transverse perforation 26 and formed in its upper edge with a notch 27. Either the perforations 26 or the notch 27 may be utilized for the coupling of a tensioning-strap to the finger 25, as will more fully hereinafter appear.

The clamping-arms 10 and 11 are pivotally interconnected by means of a rivet or other suitable pivoting means 28 extending laterally through the reaches 12 and 20 respectively of the said arms 10 and 11. It will be noted from the accompanying drawings that the reach 12 of the clamping-arm 10 is considerably longer than the corresponding reach 20 of the clamping-arm 11 in order to form a member 29 of a lever-system for swinging the said arms with respect to each other.

To the outer end of the member 29 of the clamping-arm 10 I pivotally connect, by means of a rivet or other suitable pivot 30, the inner end of an operating-lever 31 by means of which latter the tire tool is operated in a manner as will be hereinafter described. Closely adjacent the pivot 30 I pivotally connect to the operating-lever 31 by means of a rivet 32 a substantially L-shaped link 33 having its opposite end pivotally fastened by means of a rivet 34 to the reach 21 of the clamping-arm 11.

In conjunction with the complementary clamping-arms 10 and 11 before described and their associated parts, I employ a strap-member 35 which is intended on occasion to have its respective opposite ends attached to the strap-attaching fingers 17 and 25 of the complementary clamping-arms 10 and 11. In the construction shown, I have employed for the purpose described an elastic strap in the form of a helically-wound spring having at its respective opposite ends hook-like terminals 36 and 37. It is intended that normally the strap-member shall be more or less permanently hooked into one or the other of the perforations 18 and 26 of the fingers 17 and 25 respectively, and be detachably engaged with either of the notches 19 or 27 of the opposite finger. In the instance shown, the strap-member 35 is semi-permanently attached to the strap-attaching finger 17 of the clamping-arm 10 by having its hook-like terminal 36 hooked through the perforations 18 in the said finger.

As before pointed out, my improved tire tool is primarily adapted for use in connection with tires mounted upon so-called "drop" or "depressed-center" rims. My invention is illustrated in the accompanying drawings in connection with a rim 38 of the type referred to, which rim it will be noted is formed laterally midway between its respective opposite flanges 39 and 40 with an inwardly-offset annular channel 41 which constitutes the so-called "drop" or "depressed-center" of the rim. Flanking the depressed center of the rim on respective opposite sides thereof are complementary tire-bead seats 42 and 43 respectively adapted to receive the complementary beads 44 and 45 of a tire-casing or shoe 46. The casing 46 houses, in the usual manner, a tube 47 having an inwardly-extending valve-stem 48 passing between the complementary beads 44 and 45 respectively of the casing and inwardly through a perforation 49 in the bottom of the annular channel 41 before referred to.

For the purpose of making clear the operation of the particular tire tool herein chosen for the illustration of my invention, let it be presumed that the tool has been applied to the tire-casing 46 as shown in Fig. 2 of the drawings, and let it be further supposed that the tube 47 is deflated for one reason or another and that it is desired to remove the said casing 46, together with its tube 47 from the rim 38.

In applying my improved tire tool to the casing, as above described, the tire-engaging fingers 14 and 15 of the arm 10 and the fingers 22 and 23 of the arm 11 are preferably located so as to straddle the tire-stem 48, as clearly shown in Fig. 5.

By swinging the operating-lever 31 in a clockwise direction from the position in which it is shown in Fig. 2 to the position in which it is shown in Fig. 3, the complementary clamping-arms 10 and 11 of the tool will be thereby moved toward each other with the effect of causing the fingers 14—15 and 22—23 to laterally compress the casing to move the beads 44 and 45 thereof inwardly off their respective seats 42 and 43 and into alignment with the annular channel or drop-center 41 of the rim 38. If the movement of the operating-lever 31 just referred to is continued to bring the said lever into the position in which it is indicated by broken lines in Fig. 3, the pivot 32 will thereby be moved slightly past dead center with respect to the pivots 30 and 34 to thus provide an automatic lock to hold the casing 46 in its laterally-compressed condition.

Having laterally compressed the casing 46 as illustrated in Fig. 3, the said casing may now be moved bodily in substantially its own plane to enter the portion of its beads 44 and 45 adjacent the tool into the drop-center or annular channel 41 of the rim. This bodily displacement of the casing in its own plane may be effected by the operator exerting force directly upon the casing or by the act of stretching the strap-member 35 beneath the rim 38 and hooking the same into the notch 27 of the finger 25, as shown in Fig. 4 of the drawings. It will be noted in the figure just referred to that when the portions of the beads 44 and 45 of the casing 46 on the edge of the latter have been compressed by the tool and displaced into the drop-center 41 of the rim, the diametrically-opposite portion of the said casing will have moved away from the rim to a degree sufficient to permit it to be swung laterally in either direction clear of the flange 39 or the flange 40.

Preparatory, however, to swinging the free edge of the casing, as just above described, the operating-lever 31 is now swung counterclockwise from the position in which it is shown in Fig. 4 to the position in which it is shown in Fig. 6, to thereby separate the complementary arms 10 and 11 and to further tension the strap 35 and thereby firmly hold the portions of the beads 44 and 45 adjacent the tool, seated in the bottom of the drop-center 41 of the rim.

If the counterclockwise movement of the operating-lever 31 just above referred to is continued to a sufficient degree, the pivot 30 connecting the same to the arm 10 will have moved past dead center with respect to the pivots 32 and 34 and thereby afford an automatic lock for maintaining the parts in the positions in which they are shown in Fig. 6, thus leaving both hands of the operator free to swing the free edge of the tire clear of the rim.

After the free edge of the casing has been swung clear of the rim, the tool having answered its purpose may be removed from the casing by swinging its operating-lever 31 to relax the tension upon the strap 35, one end of which latter is then disconnected from the finger with which it is engaged, and the tool removed.

While I have described the use of my improved tire tool in connection with the removal of the tire-casing from a drop-center rim, it will be appreciated that it is also useful in facilitating the application of a casing to a rim.

It will be understood by those skilled in the art that my invention may assume varied physical forms without departing from my inventive concept and I, therefore, do not limit my invention to the specific embodiment herein chosen for illustration, but only as indicated in the appended claims.

I claim:

1. A tire tool, primarily designed for the removal and installation of tires with respect to drop-center rims, having a pair of complementary clamping-arms movable toward and away from each other and respectively adapted to engage opposite sides of a tire to laterally compress the same; an operating-member interconnected to the said clamping-arms for moving the same as described; and a strap-member designed and adapted to extend beneath the tire-rim and to be engaged at its respective opposite ends with said clamping-arms for being placed under tension by a movement of the said operating-member.

2. A tire tool, primarily designed for the removal and installation of tires with respect to drop-center rims, having a pair of complementary clamping-arms movable toward and away from each other and respectively adapted to engage opposite sides of a tire to laterally compress the same; an operating-member interconnected to the said clamping-arms for moving the same as described; and a strap-member designed and adapted to be engaged with the tire-rim and to be operatively connected to the said clamping-arms for being placed under tension by a relative movement thereof.

3. A tire tool, primarily designed for the removal and installation of tires with respect to drop-center rims, having a pair of complementary clamping-arms movable toward and away from each other and respectively adapted to engage opposite sides of a tire to laterally compress the same; an operating-member interconnected to the said clamping-arms for moving the same as described; and a strap-member in the form of an elastic helically-wound spring designed and adapted to be engaged with the tire-rim and to be operatively connected to the said clamping-arms for being placed under tension by a relative movement thereof.

4. A tire tool, primarily designed for the removal and installation of tires with respect to drop-center rims, having a pair of complementary clamping-arms pivotally interconnected for swinging movement toward and away from each other and respectively adapted to engage opposite sides of a tire to laterally compress the same; and a strap-member adapted to be engaged with a tire-rim and adapted to be operatively connected to the said clamping-arms for being placed under tension by a relative spreading movement of said clamping-arms.

5. A tire tool, primarily designed for the removal and installation of tires with respect to drop-center rims, having a pair of complementary clamping-arms pivotally interconnected for swinging movement toward and away from each other and respectively adapted to engage opposite sides of a tire to laterally compress the same; and an elastic strap-member adapted to be engaged with a tire-rim and adapted to be operatively connected to the said clamping-arms for being placed under tension by a relative spreading movement of said clamping-arms.

6. A tire tool, primarily designed for the removal and installation of tires with respect to drop-center rims, having a pair of complementary clamping-arms pivotally interconnected for swinging movement toward and away from each other and respectively adapted to engage opposite sides of a tire to laterally compress the same; and a spring-like elastic strap-member adapted to be engaged with a tire-rim and adapted to be operatively connected to the said clamping-arms for being placed under tension by a relative spreading movement of said clamping-arms.

7. A tire tool, primarily designed for the removal and installation of tires with respect to drop-center rims, having a pair of complementary clamping-arms pivotally interconnected for swinging movement toward and away from each other and respectively adapted to engage opposite sides of a tire to laterally compress the same; a strap-member designed and adapted to be engaged with a tire-rim and adapted to be operatively connected to the said clamping-arms for being placed under tension by a relative movement thereof; and an operating-member pivotally interconnected to both of said arms for moving the same as described.

8. A tire tool, primarily designed for the removal and installation of tires with respect to drop-center rims, having a pair of complementary clamping-arms pivotally interconnected for swinging movement toward and away from each other and respectively adapted to engage opposite sides of a tire to laterally compress the same; a strap-member designed and adapted to be engaged with a tire-rim and adapted to be operatively connected to the said clamping-arms for being placed under tension by a relative movement thereof; and an operating-lever for imparting relative movement to the said arms and being directly pivoted to one arm and pivotally interconnected to the other arm by an interposed link.

FREDERICK G. ALLEN.